United States Patent

[11] 3,609,159

[72] Inventors Don Pierre R. L. Guidicelli
Val de Marne;
Henry Najer, Paris, both of France
[21] Appl. No. 655,002
[22] Filed July 21, 1967
[45] Patented Sept. 28, 1971
[73] Assignee Les Laboratoires Dausse
Paris, France
[32] Priority Mar. 1, 1963, Mar. 15, 1963, Sept. 24, 1965
[33] France
[31] 926,545, 928,067 and 32,611
Continuation-in-part of application Ser. No. 580,908, Sept. 21, 1966, now abandoned, Continuation-in-part of application Ser. No. 348,296, Feb. 28, 1964, now abandoned.

[54] 5-PHENYL-2-CYCLOPROPYLAMINO-4-OXAZOLINONE, AND PROCESS FOR MAKING THE SAME
2 Claims, No Drawings

[52] U.S. Cl. ..................................... 260/307 A,
260/544 M, 260/553 E, 424/272
[51] Int. Cl. ..................................... C07d 85/30
[50] Field of Search ........................... 260/307 (1)

[56] References Cited
UNITED STATES PATENTS 2,892,753   6/1959   Schmidt et al. ............... 260/307
3,029,189   4/1962   Hardy et al. .................. 260/307
3,037,990   6/1962   Hardy et al. .................. 260/307
3,047,461   7/1962   Hardy et al. .................. 260/307

OTHER REFERENCES

Najer et al., Bull. Soc. Chim. France, Ser. 5, pages 1810–1813 (1963).

*Primary Examiner*—Alton D. Rollins
*Attorney*—Stevens, Davis, Miller & Mosher

ABSTRACT: New 5-aryl-2-cycloalkylamino-4-oxazolinones of the formula:

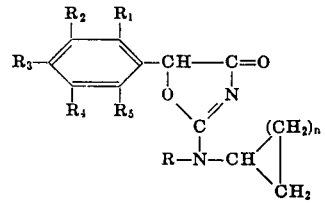

in the form of racemate or optical isomer and its acid addition salts, wherein $R_1$, $R_2$, $R_3$, $R_4$ and $R_5$ are each hydrogen, halogen, trifluoromethyl, lower alkyl, lower alkoxy, amino, amino substituted by one or two alkyl, cycloalkyl or aryl radicals, or by an aliphatic, alicyclic or aromatic acyl radical, an aliphatic, alicyclic or aromatic acyl radical, alkylmercapto, sulphonamido, mono- or di-substituted sulphonamido, cyano, or a substituted or unsubstituted carbamoyl radical; $n$ is 1, 2, 3 or 4; and R is hydrogen, lower alkyl, cycloalkyl, or lower ω-hydroxyalkyl are useful as stimulants of the central nervous system and as anorexic agents.

5-PHENYL-2-CYCLOPROPYLAMINO-4-OXAZOLINONE, AND PROCESS FOR MAKING THE SAME

These compounds may be prepared by cyclizing a compound of the formula:

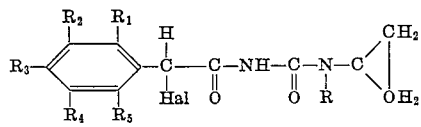

in which Hal denotes a halogen atom, more especially a chlorine atom, and R, $R_1$, $R_2$, $R_3$, $R_4$, and $R_5$ are as aforesaid, the cyclization being effected by heating the said urea compound in the presence of the calculated amount of sodium alcoholate or other suitable hydrogen halide acceptor.

This application is a continuation-in-part of copending applications Ser. No. 348,296 filed Feb. 28, 1964, and Ser. No. 580,908, filed Sept. 21, 1966, and both now abandoned.

This invention relates to new compounds, their preparation and pharmaceutical compositions containing the same, more particularly to new oxazolinones which, as stimulants of the central nervous system and anorexic agents, are unexpectedly more potent than the 5-phenyl-2-unsubstituted and substituted amino-4-oxazolinones heretofor proposed for these purposes.

The present invention provides, as new compounds in both racemic and optically active forms, the oxazolinones of the formula

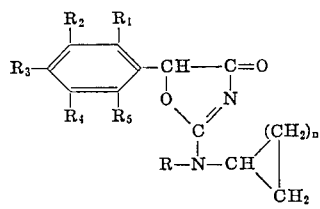

and their acid addition salts, wherein $R_1$, $R_2$, $R_3$, $R_4$ and $R_5$ are each hydrogen, halogen (such as chlorine, bromine, iodine or fluorine), trifluoromethyl, lower alkyl, lower alkoxy, amino, amino substituted by one or two alkyl, cycloalkyl, or aryl radicals, or by an aliphatic, alicyclic or aromatic acyl radical, an aliphatic, alicyclic or aromatic acyl radical, alkylmercapto, sulfonamido, mono- or di- substituted sulfonamido, cyano, or a substituted or unsubstituted carbamoyl radical; $n$ is 1, 2, 3 or b 4; and R is hydrogen, lower alkyl, cycloalkyl, or lower ω-hydroxy-alkyl.

Especially valuable compounds of formula I are those in which $R_1$, $R_2$, $R_3$, $R_4$ and $R_5$ are each hydrogen, halogen or lower alkyl, R is hydrogen or lower alkyl, and $n$ is 1, 2, 3, or 4.

The new oxazolinones may be prepared by cyclizing a urea compound of the formula:

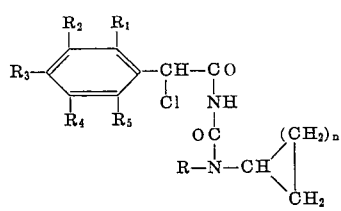

The starting material of formula II may be prepared by condensing an α-aryl-α-chloracetyl chloride of formula III with a urea of formula IV, the symbols being as defined above, in accordance with the following reaction scheme:

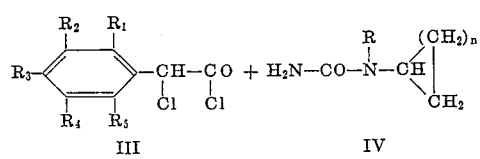

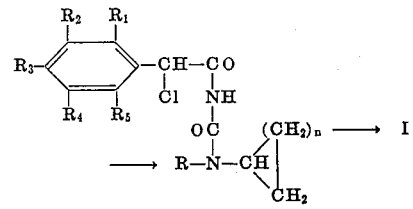

The initial condensation can be effected in an organic solvent, preferably in benzene, at reflux temperature and in the presence of an acceptor for the hydrochloric acid formed during the reaction, for example dimethylaniline.

A ureide of formula II is obtained, and this is then cyclized to a 5-aryl-2-cycloalkylamino-4-oxazolinone of formula I, e.g., by heating in ethanol with an equimolecular amount of sodium ethoxide.

The salts of the compounds of formula I may be prepared in conventional manner, bearing in mind that those compounds in which $n=1$ are somewhat sensitive to acid, and that it is necessary in such cases to insure that the cyclopropyl ring is not destroyed by the action of the acid. This may be done, for example, by preparing the salt in an inert anhydrous medium, such as diethyl ether or benzene. The base and the appropriate acid are mixed together in stoichiometric proportions, and the acid addition salt isolated in the usual manner.

The invention will be further understood by the following description in which are included examples of the process for the production of these novel compounds and of the preparation and use of pharmaceutical compositions therefrom. It will be understood that the several examples are intended to be illustrative of the invention and not in any way a limitation thereof.

It is well known that 5-phenyl-2-amino-4-oxazolinone is a stimulant for the central nervous system, and that a few N-substituted derivatives thereof are more powerful stimulants than said 5-phenyl-2-amino-4-oxazolinone, to wit in the order of decreasing activities, the 2monoethylamino, 2-monomethylamino and 2-dimethylamino derivatives. It is further known that in the 2-monoalkylamino derivative series, the activity decreases very quickly from 2 carbon atoms in the alkyl group upwards and eventually is reversed. More particularly the n-monopropylamino derivative shows but a very low activity and the monoisopropylamino compound shows no activity.

It was thus quite unexpected to find that although having a 3-carbon atom group attached to the nitrogen atom in the 2-position, a 5-phenyl-2-mono-substituted amino-4-oxazolinone is definitely more potent than all above named, stimulating compounds.

EXAMPLE I a. N -cyclopropyl-N'-(alpha-phenyl-alpha-chloro-acetyl) urea:

Into a three-necked spherical flask having a capacity of 1 liter and provided with a dropping funnel, a condenser surmounted by a calcium chloride tube and a mechanical stirrer, there were suspended 17.6 g. (0.176 g.-mol) of cyclopropylurea and 21.3 g. (0.176 g.-mol) of dimethylaniline in 310 ml. of anhydrous benzene. While stirring, there was added through the dropping funnel in 45 minutes a solution of 33.3 g. (0.176 g.-mol) of alpha-phenyl-alpha-chloroacetyl chloride in 130 ml. of anhydrous benzene. The mixture was then left at ambient temperature with stirring for 1 hour then heated under reflux on the water bath with stirring for 5 hours.

The benzene solution was decanted while still warm and thereby separated from an oil deposited on the flask wall, the benzene was evaporated on the water bath in vacuo, the oily residue was triturated 3 successive times in 100 ml. of ether, ether being decanted each time, the last traces of ether were removed in vacuo, then the oil was triturated in 250 ml. of water until it crystallized. The crystalline precipitate was filtered off, copiously washed with water and dried in vacuo over phosphorus pentoxide.

There were thus recovered 24.7 g. (yield 55 percent) of N - cyclopropyl - N' - (alpha - phenyl - alpha - chloroacetyl) - urea which, when recrystallized from 400 ml. of a mixture of ethyl alcohol and hexane (1 : 4), had a melting point of 134°–135° C.

Analysis : $C_{12}H_{13}ClN_{o.-mol)} O_2$ (Mol weight 252.5)
percent calc. C 57.03 H 5.15 Cl 14.05 N 11.09
percent found 56.88 5.09 13.33 11.16
56.77 5.21 13.70 11.17 b. 5-phenyl-2-monocyclopropylamino-4-oxazolinone.

16.6 g. (0.066 g.-mol.) of this N -cyclopropyl-N'- alpha-phenyl-alpha-chloroacetyl)-urea was dissolved in a sodium ethoxide solution containing 1.5 g. (0.066 g.-atom) of sodium in 330 ml. of absolute ethyl alcohol, and the mixture was heated under reflux for 2 hours. The precipitated sodium chloride was filtered off, alcohol was evaporated from the filtrate on the water bath in vacuo, the gummy residue was triturated in 150 ml. of water until it crystallized, and the compound was filtered off, copiously washed with water and dried in vacuo over phosphorus pentoxide.

There were recovered 11.4 g. (yield 80 percent) of 5-phenyl-2-monocyclopropylamino-4-oxazolinone which, when recrystallized from 500 ml. of a mixture of ethyl alcohol and hexane (1 : 4), had a melting point of 139°–140° C.

UV spectrum (in ethanol): $\lambda$ max.: 224 M$\mu$($\epsilon$=25900)
IR spectrum (in KBr): 1740 cm.$^{-1}$ (C=0), 1640 cm.$^{-1}$ (C=N)

Analysis $C_{12}H_{12}N_2O_2$ (Mol weight 216)

| % calc. | C 66.66 | H 5.55 | N 12.96 |
|---|---|---|---|
| % found | 66.52 | 5.64 | 13.25 |
| | 66.74 | 5.60 | -oxazolinone |

5-phenyl-2-monocycloproylamino-4-oxazolinone is a white crystalline substance which is soluble in cold ethyl alcohol, insoluble in water, stable in alkaline medium but unstable in acid medium. A suspension of the oxazolinone in boiling 10 percent aqueous solution of sulfuric acid, is converted very quickly to 5-phenyl-oxazolidine-2, 4-dione.

The corresponding 2-monocyclobutylamino, 2-monocyclopentylamino and 2-monocyclohexylamino compounds may be prepared similarly. However, when tested, these compounds exhibit no pharmacological activity whereas the 2-monocyclopropylamino compound exhibits central nervous system stimulating properties and anorexigenic properties much more potent than those of 5-phenyl-2(unsubstituted) amino-4-oxazolinone, of the various 5-phenyl-2-mono-loweralkylamino-4-oxazolinones, and of 5-mono-cyclopropylamino-4-oxazolinone has much more favorable therapeutic index and margin of safety than the other 5-phenyl-2-amino-4-oxazolinones (whether substituted or not in the amino group in the 2-position).

Observations made after injecting intraperitoneally in mice 0.01 g./kg. of 5-phenyl-2-monocyclopropylamino-4-oxazolinone comparatively with the following known compounds administered by the same route: 5-phenyl-2-monomethylamino-4-oxazolinone (0.05 g./kg.), 5-phenyl-2-monoethylamino-4-oxazolinone (0.01 g./kg. and 0.05 g./kg.) and 5-phenyl-2-dimethylamino-4-oxazolinone (0.05 g./kg.), are set out in the following table:

TABLE I

| 5-Phenyl-4-oxazolinone compound | Dosage g./kg. (i.p.) | Maximum intensity of motive excitation | Duration of maximum activity (minutes) | Total duration of excitation (hours) |
|---|---|---|---|---|
| 2-monocyclopropylamino | 0.01 | from +++ to ++++ | 120–180 | >6 |
| 2-monomethylamino | 0.05 | ++++ | 120–180 | >6 |
| 2-monoethylamino | 0.01 | from + to ++ | 30–60 | about 3 |
| 2-monoethylamino | 0.05 | ++++ | 120–180 | 6 |
| 2-dimethylamino | 0.05 | from ++ to +++ | 90–120 | >6 |
| Controls | | + | | |

In the above table "++++" indicates the greatest motive activity, and "+"indicates the least.

The same experiment carried out by administering the compounds orally gave very similar results except as regards the monomethylamino compound, which was inferior to the monoethylamino compound.

The central nervous system stimulating properties of this new monocyclopropylamino 4-oxazolinone were further demonstrated by the inhibiting effect that said compound produces towards the depressing effects of reserpine.

Two lots of 10 mice were given orally 0.010 g./kg. of the new compound (first lot) and 0.010 g./kg. of dl-amphetamine (second lot) while a third lot of 10 mice served as a control. 2 hours after the ingestion of the above substances by the animals in the first two lots, the mice in the three lots were given 0.002 g./kg. of reserpine (dissolved in a mixture of acetic acid, propylene-glycol and water) by the intraperitoneal route. The animals were then observed 1 hour, 3 hours and 18 hours after the injection of reserpine. The results are tabulated below:

TABLE II

| 5-phenyl-4-oxazolinone compound | Dosage in g./kg. (per os) | Spontaneous activity after injecting reserpine | | |
|---|---|---|---|---|
| | | 1 hour | 3 hours | 18 hours |
| 2-monocyclopropylamino | 0.010 | # | +, ptosis 8/10 | +++, ptosis 7/10. |
| dl-Amphetamine | 0.010 | # | ++, ptosis 10/10 [1] | +++, ptosis 10/10.[2] |
| Controls | | +++, ptosis 10/10 | +++, ptosis 10/10 | +++, ptosis 10/10. |

[1] 1 death.
[2] 2 deaths.

NOTE.—+++ strong depression; ++ mean depression; + weak depression; # definite activity.

The above table shows that 5-phenyl-2-monocyclopropylamino-4-oxazolinone produces antidepressing effects at least equal to those caused by dl-amphetamine towards the action of reserpine.

EXAMPLE II

Preparation of 5-(p-chlorophenyl)-2-cyclopropylamino-4-oxazolinone a. N-cyclopropyl-N'-($\alpha$-p-chlorophenyl-$\alpha$-chloroacetyl) urea.

17.6 g. (0.176 g. mole) of cyclopropylurea, 21.3 g. (0.176 g. mole) of dimethylaniline, and 310 ml. of anhydrous benzene are introduced into a 1-liter, 3-necked flask, fitted with a mechanical stirrer, a dropping funnel, and a condenser topped by a calcium chloride tube. 39.3 g. (0.176 g. mole) of $\alpha$-p-chlorophenyl-$\alpha$-chloroacetyl chloride in 130 ml. of anhydrous benzene are added to this suspension, which is stirred mechanically, from the dropping funnel over the course of 45 minutes.

The reaction mixture is then left for 1 hour at ambient temperature. The reaction is finished by heating under reflux for 5 hours on a water bath. The mixture is allowed to cool. An oil which has deposited on the walls of the flask is separated, the benzene is evaporated on a water bath in vacuo, the oily residue is triturated successively three times with 100 ml. of ether with decantation on each occasion, the last traces of ether are removed in vacuo, and the oil is then triturated with 250 ml. of water until it crystallizes. The crystals are filtered off, copiously washed with water, and the compound dried in vacuo over phosphorus pentoxide. 28.6 g. (56 percent yield) of N-cyclopropyl-N'-($\alpha$-p-chlorophenyl-$\alpha$-chloroacetyl)urea are obtained. After recrystallization from isopropyl alcohol, it melts at 132° C.

Analysis for $C_{12}H_{12}Cl_2N_2O_2$ (M.W.=287):
Calc. percent: C=50.18 percent H=4.18 percent Cl=24.74 percent N=9.76 percent
Found: C=50.27 percent H=4.07 percent Cl=24.51 percent N=9.81 percent b. 5-(p-chlorophenyl)-2-cyclopropylamino-4-oxazolinone
28.7 g. (0.1 g. mole) of N-cyclopropyl-N'-($\alpha$-p-chlorophenyl-$\alpha$-chloroacetyl urea dissolved in a solution of sodium ethoxide obtained by dissolving 2.3 g. (0.1 g. atom) of sodium in 500 ml. of absolute alcohol, and the mixture is heated for 2 hours under reflux. The sodium chloride produced is filtered off, the alcohol is evaporated from the filtrate on a water bath in vacuo, the gummy residue is triturated with 250 ml. of water until it crystallizes, and the compound is filtered off, copiously washed with water and dried in vacuo over phosphorus pentoxide. 18.5 g. (64.5 percent = yield) of 5-p-chlorophenyl-2-cyclopropylamino-4-oxazolinone are obtained. After recrystallization from absolute alcohol, it melts at 211° C.

Analysis for $C_{12}H_{11}ClN_2O_2$ (M.W.=250.5)
Calc. C=57.49 percent H=4.38 percent Cl=14.17 percent N=11.16 percent
Found: C=57.41 percent H=4.32 percent Cl=14.31 percent N=11.29 percent

EXAMPLE III

Preparation of 5-phenyl-2-(N-cyclopropyl-N-methylamino)-4-oxazolinone a. N-cyclopropyl-N-methyl-N'-($\alpha$-phenyl-$\alpha$-chloractyl)-urea 11.4 g. (0.1 g. mole) of N-cyclopropyl-N-methyl urea, 12.1 g. (0.1 g. mole) of dimethylaniline and 200 ml. of anhydrous benzene are introduced into a 1 liter, three-necked, round-bottom flask provided with a dropping funnel, a mechanical stirrer, and a reflux condenser closed with a calcium chloride tube. 18.9 g. (0.1 g. mole) of $\alpha$-phenyl-$\alpha$-chloracetyl chloride in 100 ml. of anhydrous benzene are added to this suspension, which is stirred mechanically, from the dropping funnel over the course of 1 hour. The reaction mixture is left for 1 hour at room temperature, and the reaction is then completed by heating under reflux for several hours on a water bath. The mixture is allowed to cool, the supernatant liquid is decanted from the oil sticking to the walls of the flask, and the oil is then triturated three times with 100 ml. of diethyl ether each time. After removal of the last traces of ether in vacuo, the oil is triturated with 150 ml. of water until it crystallizes. The crystalline residue is then filtered off, washed with water and dried in vacuo over phosphorus pentoxide. 13.2 g. (50 percent yield) of N-cyclopropyl-N'-methyl-N'-($\alpha$-phenyl- chloracetyl) urea are obtained.

Analysis for $C_{13}H_{15}N_2O_2Cl$ (M.W =266.5)
Calc. C=58.54 percent H=5.63 percent N=10.50 percent
Found: C=58.13 percent H=5.61 percent N=10.41 percent
58.42 percent 5.82 percent 10.68 percent b. 5-phenyl-2-(N-cyclopropyl-N-methylamino)-4-oxalinone
26.6 g. (0.1 g. mole) of N-cyclopropyl-N-methyl-N'-($\alpha$-phenyl-$\alpha$-chloracetyl)urea are dissolved in a solution of sodium ethoxide obtained by dissolving 2.3 g. (0.1 g. atom) of sodium in 500 ml. of absolute ethanol, and the mixture is heated for 2 hours under reflux. The sodium chloride produced is filtered off, the alcohol is evaporated from the filtrate on a water bath in vacuo, and the gummy residue is triturated with 250 ml. of water until it crystallizes. The crystalline residue is filtered off, washed with water and dried in vacuo over phosphorus pentoxide. 15.1 g. (60 percent yield) of 5-phenyl-2-(N-cyclopropyl-N-methylamino)-methylamino)-4-oxazolinone are obtained. After recrystallization from a mixture of ethyl acetate and hexane (2:3), it melts at 95° C.

Analysis for $C_{13}H_{14}N_2O_2$ (M.W.=230)
Calc. C=67.83 percent H =6.09 percent N=12.17 percent
Found: C=67.80 percent H=6.13 percent N=11.95 percent
67.61 percent 6.28 percent 12.20 percent The ultraviolet absorption spectrum shows $\lambda$max. $C_2H_5OH$= 230 $\mu$. $\epsilon$=28,000

The new 5-aryl-2-cycloalkylamino-4-oxazolinones show pharmacodynamic effects which render them of value in therapy. In particular, they exert a stimulant effect on the central nervous system, and an inhibitory effect on the appetite. The two effects do not necessarily appear with equal intensity.

The compound of example III possesses particularly strong central stimulant properties, as may be shown by oral or intraperitoneal administration in the mouse. In a dose of 1 mg./kg., it provokes very strong motor hyperactivity, and the intensity and duration of the effect increases as the dose increases, as shown in the following table:

| Dose (mg./kg.) | % increase in motor activity with reference to the controls | |
|---|---|---|
| | 30 minutes after administration | 60 minutes after administration |
| 1 | 60 | 110 |
| 2 | 140 | 210 |
| 3 | 210 | 280 |

In equal doses, d-amphetamine provokes essentially the same motor hyperactivity but is less long-lasting in effect. In addition, amphetamine is a convulsent, unlike the new compounds.

Tests carried out in rats according to the method of A. P. Roszkowski et al. (J. Pharmacol. Exp. Th. 1963, 140, 367) show that the ED 50 of the 2-monocyclopropylamino compound of example I and d-amphetamine are very similar, to wit:

d-amphetamine 2.6 mg./kg.
2-monocyclopropylamine compound 3.1 mg./kg.

The anorexigenic effect of the compound of example III likewise is not significantly different from that of d-amphetamine. The oral toxicity of this new compound administered orally in the mouse is less than that of d-amphetamine. This compound has only a very slight cardiovascular effect in the cat or dog in doses up to 5 mg./kg. administered parenterally.

The toxicity of the 5-phenyl-2-monocyclopropylamino-4-oxazolinone is low in comparison with the activity thereof. Thus, while said activity was found to be four to five times greater than that of 5-phenyl-2-monoethylamino-4-oxazolinone (the most potent compound per os in the group of 2-monoalkylamino and 2-dimethylamino compounds), the respective lethal doses (LD 50) are 5-phenyl-2-monoethylamino-4-oxazolinone. G./kg.
   Intraperitoneal route 0. 170
   Subcutaneous route 0. 340
5-phenyl-2-monocyclopropylamino-4-oxazolinone
   Intraperitoneal route 0. 081
   Subcutaneous route 0. 142

Thus while the 2-cyclopropylamino compound is four to five times more active than the 2-monoethylamino compound, the toxicity of the first one is only 2.5 times greater than that of the second one, i.e. has a therapeutic index about twice better.

These new 5-phenyl-2-cyclopropylamino-4-oxazolinones may be employed for therapeutic purposes:

I. As a psychotonic drug:
  in depressive states having various causes, to combat physical and mental asthenia and to increase the psychic tonus and the power of concentration and attention:
  in states in which anxiety with inhibition constitutes a dominant symptom, to produce the reappearance of "spirit" with the resumption of rational activity and the power to analyze facts logically.

II. As an "antifatigue" agent by means of which it is possible to postpone the hour of normal sleep without inhibiting sleep on retiring to bed.

III. As an anorexigenic.

The invention includes within its scope pharmaceutical compositions comprising a compound of formula I in association with a compatible pharmaceutically acceptable diluent or carrier, and preferably in a form suitable for oral administration. Each unit dose should contain an amount of active ingredient such that a daily dose of 1 to 1,000 mg. of active substance can be spread over two to four unit doses. For the compound of example III, a daily dose of 1 to 50 mg. in unit doses each containing 1 to 10 mg. is generally suitable. The compound of example I may be administered orally in the form of tablets containing from 1 to 30 mg. of active substance; a daily dosage of from 1 to about 15 mg. being preferred where the production of anorexic effects is to be sought, while higher dosages, e.g. about 15 to about 60 mg., are preferably adopted where stimulation of the central nervous system is particularly sought.

An example of a composition for a tablet is as follows:

| | |
|---|---|
| 5-phenyl-2-cyclopropylamino-4-oxazolinone | 0.001 g. |
| Lactose | 0.0635 g. |
| Corn starch | 0.008 g. |
| Tricalcium phosphate | 0.025 g. |
| Orange yellow S | 0.0005 g. |
| Magnesium stearate | 0.002 g. |

Particularly advantageous forms of oral administration of the new compounds are provided by 5-phenyl-2-cyclopropylamino-4-oxazolinone fixed on certain pharmaceutically acceptable synthetic resins of the cation exchange resin type, for example cation exchange resins containing sulfonic groups, a suitable one being Amberlite I.R. 120 [H] +. Such a resin with the 5-phenyl-2-cyclopropylamino- 4-oxazolinone fixed thereon may be depicted as an acid addition salt which may be termed a "resinate."

An advantage of such a "resinate" is that the new amine is gradually liberated therefrom in the organism after it has been administered. Hence the therapeutic action is protracted and the total daily dosage of drug may be administered at one go, a point believed particularly important as the new compound is anorexigenic to a considerable degree.

With a view to preparing such a "resignate," a solution of 5-phenyl-2-cyclopropylamino-4-oxazolinone may be passed through a column or bed of the cation exchange resin until the 5-phenyl-2-cyclopropylamino-4-oxazolinone content in the effluent is the same as in the feed; the proportion of oxazolinone compound thus fixed varies according to the cation exchange resin.

The "resinates" are preferably encapsuled, e.g. in conventional gelatin capsules containing 1 to 60 mg. of 5-phenyl-2-cyclopropylamino-4-oxazolinone. For example, one capsule may contain 5 mg. of said oxazdinone fixed on the required amount of Amberlite I.R. 120 [H]+ for saturation with said oxazolinone.

It should be understood, of course, that the foregoing disclosure relates only to preferred embodiments of the invention and that it is intended to cover all changes and modifications of the examples of the invention herein chosen for the purposes of the disclosure which do not constitute departures from the spirit and scope of the invention.

We claim:

1. A compound of the formula

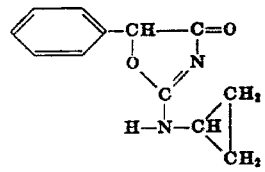

and the nontoxic acid addition salts thereof.

2. A method for producing the compound of the formula

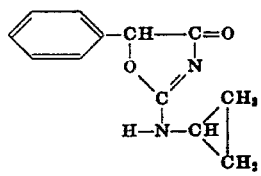

which comprises heating to reflux temperature in a lower aliphatic alcohol medium a mixture of sodium ethoxide with an equimolecular amount of a urea of the formula

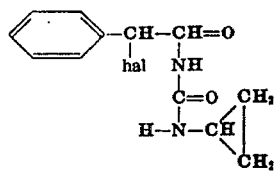

wherein hal is halogen, to cyclize said urea.